Patented Nov. 11, 1952

2,617,712

UNITED STATES PATENT OFFICE 2,617,712

POTASSIUM ZEOLITES

George R. Bond, Jr., Paulsboro, N. J., assignor to Houdry Process Corporation, Wilmington, Del., a corporation of Delaware No Drawing. Application June 18, 1949, Serial No. 100,080

7 Claims. (Cl. 23—112)

The present invention relates to contact masses and their preparation, more particularly it is concerned with the production and treatment of materials having zeolitic properties, usually those materials which are prepared from soluble silicates by wet methods.

Artificial zeolites prepared by reaction of soluble silicates with aluminum compounds or other inorganic compounds have found wide use in the treatment of water and for other purposes wherein the base exchanging capacity of the zeolite is utilized. The known materials conventionally in use for this purpose, and particularly artificially prepared siliceous exchange materials such as zeolites, are quite friable in dry state or lose a considerable portion of their exchange capacity on heating to even moderate calcination temperatures.

I have found, that inorganic base exchange siliceous materials, such as zeolites comprising hydrosilicate of aluminum, containing potassium in base exchange position can be heated to elevated temperatures sufficient to fix the structure of the materials, imparting hardness thereto while retaining to a predominant extent their exchange capacity. In accordance with the invention a technique is provided for the manufacture of rugged high capacity material for base exchanging purposes, such as water softening or purification of sugar solutions, etc., which material is largely free from defects of previously-used zeolitic materials of this class. The involved technique, moreover, is applicable to the preparation of contact masses for use in operations other than those primarily associated with ion exchange, such as siliceous catalysts.

In accordance with the invention a base-exchange mass comprising silica and alumina is prepared containing potassium in base-exchange position and the mass is calcined at a temperature in excess of 500° F. to fix the structure of the mass, thereby removing a large part of the associated water. The calcined mass can then be directly employed in known manner for softening of water or other purification of fluids by ion exchange, and is capable of regeneration in customary manner by removal of contaminating ions thus taken up, with solutions containing ammonium, hydronium or alkali metal ions.

The high temperature stability of the potassium-containing aluminum silicates was not to be expected, in view of the known behaviour of corresponding zeolites containing sodium. Thus, in the preparation of siliceous catalysts to be employed in high temperature contacting reactions, such as catalysts for hydrocarbon conversion reactions, the removal of sodium associated in the siliceous product as contaminant from the reactants employed in manufacture of the product, is deemed essential for production of catalysts having and retaining desired catalytic activity when used at the required elevated temperatures. The fluxing action of alkali metal salts on siliceous and other minerals being known, it is commonly believed that the loss in activity demonstrated in connection with the use of silica-alumina catalyst containing sodium, is associated with this fluxing action, the inactivity being perhaps occasioned in part at least by sintering and shrinking of the catalyst with consequent loss in adsorptive capacity. In the production of sodium-free catalyst, therefore, it has been the practice in the art to remove the sodium content down to a practical insignificant residual quantity prior to the use of the catalyst at elevated temperatures encountered in a hydrocarbon conversion operation, or prior to a preparatory calcining operation designed to fix the structure and/or activity of the catalyst. Such removal of sodium is accomplished by J. R. Bates in the U. S. Patent 2,283,172, by exchanging the sodium under selected conditions by a volatile or decomposable cation, so that the obtained zeolite can be subjected to heat treatment at required temperature to drive off the volatile cation and yield a catalytic product consisting essentially of the nucleus of the zeolite.

While the ammonium-containing zeolites, such as those of the Bates patent referred to, do not shrink on heating to high temperature to the extent exhibited by the corresponding sodium-containing products, these ammonium zeolites nevertheless rapidly lose a major portion of their exchange capacity when subjected to temperatures effecting evolution of exchangeably held ammonia therefrom. The potassium-containing zeolites, on the other hand, not only shrink to a considerably lesser extent that the corresponding sodium-containing products, but retain their exchange capacity after calcination, to a remarkably higher extent than either the sodium or ammonium zeolites. The potassium zeolites retain their base exchange capacity to satisfactory extent even after heating to as high as 1400° F., and retain up to about 90% of their exchange capacity when heated under the same conditions that corresponding ammonium products have only 10% of original capacity. Moreover the calcined potassium zeolites not only can be substantially completely reexchanged with desired cations such as metal cations, ammonium and hydronium, but in the case of reexchange with ammonium demonstrate a surprising increase in thermal stability of the ammonium zeolite. Thus, a calcined potassium-containing silica-alumina gel reexchanged with ammonium and heated at 950° F. for approximately six hours, evolved only about half of its ammonia instead of the expected substantially complete evolution of ammonia.

Since the calcined potassium zeolite has a desirable base-exchange capacity and retains its structural form in contact with aqueous liquids; formed bodies such as granules, lumps, or regularly shaped masses of such potassium zeolites, such as tablets or pellets, can be prepared and then calcined, and the potassium in the calcined bodies subsequently exchanged by other desired cations through treatment with aqueous solutions comprising such desired cations. Thus a silica-alumina gel or precipitate containing potassium may be calcined and the calcined mass then treated with solutions of acids or ammonium salt solutions, or with solutions of salts such as those of chromium, magnesium, beryllium, zirconium, or other metals desired to be incorporated in the preparation of catalysts or contact masses for other uses.

For incorporation of controlled limited amounts of metallic or other cations in the zeolitic mass less than the base exchange capacity of such mass, as may be desired in the preparation of catalysts or the incorporation therein of promoters or other cations conferring certain desired properties to a catalytically active zeolitic mass, an efficient and readily controllable procedure is provided. Thus a freshly prepared siliceous zeolitic gel or precipitate containing sodium as contaminant may be treated with ammonium salt solution to free the same of sodium, and the resulting ammonium-containing zeolite then treated with a potassium salt solution containing that quantity of potassium stoichiometrically equivalent to the quantity of metallic cation desired to be incorporated. The gel can then be heated to drive off the remaining ammonia. Subsequent treatment of the gel with a solution of metal salt containing the desired cation will effect ready replacement of the potassium in the base-exchange positions by the desired metal cation, while the positions previously occupied by ammonium will be substantially unaffected.

The silica-alumina zeolite may be prepared as a gel or precipitate in known manner, for instance by reaction of alkali metal silicate and an aluminum salt. Potassium may be exchanged for other alkali metal ions present in the zeolitic gel or precipitate, before or after drying of the same, but prior to subjecting the gel or precipitate to elevated temperatures, such as above about 400° F. Because of their ready availability and low cost, commercial sodium silicates are desirable raw materials for use in preparation of siliceous products.

In a typical procedure, the fresh wet silica-alumina gel or gelatinous precipitate containing sodium (as a result of preparation from sodium silicate), is permitted to drain and/or undergo syneresis, then is partially dried, and water washed. Removal of exchangeably held sodium may then be effected by treatment with ammonium salts as described, for instance, in Bates U. S. Patent 2,283,172, or directly by treatment with potassium salt solutions. If ammonium exchange is employed, the ammonium may then be replaced entirely or to desired extent by potassium, the remaining non-exchanged ammonium being largely volatillized in subsequent calcination. Such exchange of ammonium by potassium may be performed before or after the zeolite has been shaped in pieces of desired size and form. For instance, the ammonium zeolite may be washed and dried; then made into a paste by addition of water or wet gel to obtain the desired consistency for forming of tablets or pellets by molding, extruding or other shaping operations. The pellets are then dried at a temperature below about 250° F. The dried pellets may then be base-exchanged to incorporate potassium and calcined at 800–1400° F.

The calcined pellets thus obtained can be employed directly as a water-softening and purifying agent. If a hydrogen-treated zeolite is desired, the potassium may be further exchanged or removed as by treatment with formic, acetic, or dilute mineral acid; or can be further exchanged with ammonium ions and heated to drive off $NH_3$.

The potassium zeolites may be prepared in the form of spheroidal beads, employing known methods, such as those generally described in the U. S. patents to Marisic, of which U. S. Patents Nos. 2,385,217 and 2,384,946 are typical. Thus, a silica-alumina hydrosol containing sodium may be admitted to an immiscible liquid to form globules of desired size, and the globules set to a firm gel in the immiscible liquid. The spheroidal hydrogel beads thus obtained may then be treated in wet state to substitute the sodium by potassium, or removal of sodium may be effected by treatment with ammonium salt solutions and the ammonium replaced by potassium to desired extent before or after the gel beads have been dried. The potassium-containing beads may then be calcined.

EXAMPLE I

A. A silica-alumina zeolite was prepared from a solution of commercial water glass containing by weight about 8.9% $Na_2O$ and 28.5% $SiO_2$, and a solution of sodium aluminate in proportions giving a weight ratio of $SiO_2/Al_2O_3$ of 87.5 to 12.5. Each of the solutions was diluted with water and the diluted solutions rapidly admixed in the presence of ammonium sulfate solution furnishing sulfate anion equal to about the stoichiometric equivalent of the total alkali metal content of the silicate and aluminate solutions, with the formation of a coagulum having a pH of approximately 9.7 and containing about 3.9% by weight of Na (water washed and dried basis). The product was steamed, dried at 240 to 260° F. and coarse ground. The coarse granules were treated in a counter-current system with ammonium nitrate solution and with water to remove sodium, and the product freed of excess water on a filter press. One-third of the filter cake was dried (at about 240° F.) and pulverized, then mulled with the remaining wet filter cake to form a paste which was molded into cylindrical pellets of 4 millimeter diameter and length, and the pellets dried at about 220–240° F.

The dried pellets which now contained 3.14% $NH_3$ (analysis after storage) were treated in different batches as follows:

B. The dried ammonia-containing pellets were treated with 15% aqueous potassium nitrate solution, resulting in the incorporation therein of potassium equal to 8.21% $K_2O$ by weight of the pellets;

(a) One portion of the pellets from B above was heat-treated at 1400° F. for 10 hours in 95% air—5% steam, then tested as a catalyst in cracking of a gas oil under standard conditions; only an insignificant gasoline yield was obtained.

(b) The potassium in the catalyst of (a) above after regeneration to burn off coke, was partially exchanged by hydrogen through treatment with 5% formic acid; the acid-treated pellets contained 4.12% $K_2O$. These pellets were tested as a polymerization catalyst on isobutylene at 460–490° F., resulting in the formation of 45.1% by weight liquid product containing 47.4% by weight of dimer (C₈ hydrocarbons); in a subsequent run at 460° F., after regeneration of the catalyst from the first polymerization run, there was obtained a yield of 40.4% liquid hydrocarbons containing 58.9% dimer in the liquid, producing 2.8% coke by weight of charge in the run.

(c) Another portion of the potassium-exchanged catalyst from B above was heat treated at 1050° F. for 2 hours and tested for cracking activity on gas oil; only an insignificant amount of the oil charge was cracked.

(d) The pellets from (c) above after regeneration to burn off coke deposit from the previous cracking run were partially exchanged with ammonium chloride solution, incorporating 2.7% ammonia, (the pellets contained 0.66% residual $K_2O$). One portion of the pellets was then given a static heat treatment in its own evolved vapors at approximately 1000° F. resulting in ammonia being driven off to a residual content of 1.44% $NH_3$. These pellets were then employed in cracking of a gas oil under the same conditions as the postassium-containing pellets in (c) above, resulting in an acceptable yield of gasoline (approximately 37% by volume of the charge). Another portion of the ammonium-exchanged pellets was heated in flowing air at approximately 1400° F. resulting in evaporation of the ammonia to a residual content in the pellets of 0.03%. These pellets employed in cracking of the light gas oil under the same condition as the previous catalyst gave a yield of approximately 38% gasoline by volume of the charge.

The above tests indicate that the cracking activity of the catalyst is retained after calcination of the potassium-containing zeolite and subsequent removal of potassium.

EXAMPLE II

Another batch of silica alumina pellets prepared similarly to the product described under (A) of Example I above, was analyzed; the dried pellets containing 3.3% $NH_3$.

A. The above ammonium-containing pellets were treated with 15% aqueous potassium chloride solution, (150 grams KCl per liter of solution) thereby removing $NH_3$ from the pellets by replacement with potassium to residual content of 0.21% ammonia being retained. The product was heat treated at 1050° F. for 2 hours in flowing air and then divided into a number of portions which were variously treated to determine the retention of base exchange properties, as follows:

(a) One portion of the potassium-containing pellets was treated with 5% acetic acid with the resulting removal of 36% of the potassium content.

(b) Another portion of the above potassium-containing pellets was treated with 5% formic acid resulting in the removal of about 50% of the potassium content.

(c) Another portion of the potassium containing pellets from (A) above was treated with 15% ammonium chloride solution with the resulting deposition of 2.84% $NH_3$ (1.68 milliequivalents). These pellets after heating to 950° F. and thus removing approximately half the ammonia content were tested for cracking of a gas oil under similar conditions of the previous tests; they showed satisfactory retention of catalytic activity in producing a yield of approximately 43% gasoline by volume of charge.

(d) The exchange capacity of these pellets was demonstrated by alternate exchange with potassium and ammonium ions, as follows: treatment of the pellets containing 2.84% $NH_3$ with 15% potassium chloride solution resulting in a deposition of potassium equal to 6.34% $K_2O$ and reexchange with ammonium chloride resulted in pellets having 2.83% $NH_3$. The last described pellets were again reexchanged with potassium with the resulting deposition of 6.50% $K_2O$ which was again replaced by ammonium exchange to a content of 2.86% $NH_3$.

To establish differences in the behavior of potassium and sodium in zeolites of this type a silica-alumina gel containing ammonium from the purification treatment in removal of sodium, was prepared in pellet form and dried at a temperature below 250° F.; the ammonia containing pellets were then treated with 15% sodium chloride solution to replace ammonia. Exhaustive treatment lowered the residual content to 0.66% $NH_3$ by weight of pellets, as compared with ready and nearly complete replacement of $NH_4$ by potassium. The comparative results are tabulated below:

Table 1

| Treating sol'n. | Molal Conc., Mols/l. | Total Mols Used | Residual $NH_3$ in Pellets |
|---|---|---|---|
| | | | Percent |
| 15% $KNO_3$ | 1.65 | 3.9 | 0.18 |
| 10% KCl | 1.00 | 5.4 | 0.05 |
| 15% NaCl | 2.56 | 5.3 | 1.36 |
| 15% NaCl | 2.56 | 21.7 | 0.66 |

Subsequent reexchange of the uncalcined sodium-containing pellets with ammonium chloride solution resulted in the removal of NaCl exactly equivalent to the original reduction in ammonia content. Surprising differences were noted in the heat stability of the sodium-containing pellets as compared with the potassium-containing pellets. Thus, the above sodium-containing pellets heated at 1400° F. for 10 hours at 5% steam underwent a severe shrinkage in volume of over 40% and a corresponding increase in bulk density from 0.51 to 0.78 kilogram per liter; as compared with the potassium-containing pellets which shrank under the same heat treatment about 25% to less than 30% by volume, with a corresponding increase in bulk density to about 0.6 kilogram per liter.

The heat treated sodium-containing pellets were then treated with ammonium chloride solution with the resulting desposition of 1.13% $NH_3$. This is equivalent to a theoretical removal of only 38.5% of the sodium present in the heat treated pellets, and is in sharp contrast to the corresponding 85–90% retention of base exchange capacity of the calcined potassium-containing pellets.

The reexchanged ammonia-containing pellets were again heat-treated as before, at 1400° F. for 10 hours in 5% steam, undergoing an additional 6% volume shrinkage. Tested for cracking of a light gas oil under the same conditions as the previous tests this catalyst gave a yield of only about 21–22% gasoline as compared to the 43% gasoline obtained for the similarly treated potassium-exchanged catalyst.

In the foregoing examples, the standard catalytic cracking activity tests referred to were carried out under the conditions described in Laboratory Method for Determining the Activity of Cracking Catalysts by J. Alexander and H. G.

Shimp, National Petroleum News, Technical Section, August 2, 1944, at pages R-537 and R-538. In accordance with the described method, a light East Texas gas oil is contacted with the catalyst at a temperature of approximately 800° F. under super-atmospheric pressure and at a liquid space rate of 1.5 (volume charge/volume of catalyst/per hour) for a ten minute operation period. The volume of gasoline of 410° F. cut point is measured and expressed as a percentage of the volume of oil charged, thereby designating the characteristic activity of the catalyst. In addition, the quantity of carbonaceous deposit formed in the catalyst is also usually measured and expressed in terms of weight percent of charge, and the specific gravity and weight percent of gas produced is also determined.

EXAMPLE III

To test the water softening properties of the potassium-exchanged zeolites, Chester tapwater having a hardness of 91 p. p. m. determined as $CaCO_3$, was run through a 9" bed of the zeolite in the ratio of 18.1 liters of water to 114 ml. of the zeolite at an average ratio of 0.5 volume of water per volume of zeolite per minute, resulting in a reduction of titrated hardness by about 38%, corresponding to the removal of approximately .03 gram $CaCO_3$ per liter of water. The first two liters of water passed through were at zero hardness. Regeneration of the zeolite with potassium chloride solution and analysis of the effluent showed the removal by the zeolite of more calcium and magnesium from the water than that accounted for in the decreased hardness shown on titration, and corresponded to an equivalent value of approximately .07 gram per liter calcium carbonate removed. Evaporation of the tap water sample showed the presence of 1160 parts per million of salt which may be responsible in large measure for the low values obtained by titration methods. For more efficient softening in practical use of the zeolites, a deeper bed should be employed than that of the above test.

EXAMPLE IV

A silica-alumina hydrogel is prepared from alkali-metal silicate and an aluminum compound following the procedure of Example I paragraph A, above. Removal of sodium by exchange with ammonium salt solution may be carried out before or after pelleting of the product but prior to calcination. The ammonium zeolite thus obtained, after washing and low temperature drying, is treated with 0.75% aqueous KCl solution (7.5 grams KCl per liter of solution) under agitation of the treating solution and in approximately the proportions of two liters of solution per kilogram of the zeolite. Under these conditions about 0.7 to 0.8% potassium are deposited in the zeolite, replacing the corresponding equivalent of ammonium ions.

The potassium-containing product is then washed and dried (and pelleted if not already in pellet form), and the pellets then heat-treated in flowing air at 1000-1200° F., thereby driving off ammonia, while retaining the base exchange capacity to substantially the extent of the potassium content. The pellets are then treated with a manganous salt solution in excess of the equivalent potassium content of the pellets (such as above 18 grams $MnCl_2 \cdot 4H_2O$ per kilogram of initial ammonium zeolite), which treatment can be effected by percolation, immersion or any desired manner. The manganese treated pellets are then washed and dried.

The catalyst thus prepared contains 0.5% manganese as a regeneration accelerator.

Obviously many modifications and variations of the invention as hereinbefore set forth may be made without departing from the spirit and scope thereof and therefore only such limitations should be imposed as are indicated in the appended claims.

I claim as my invention:

1. The method of preparing a hydrogen-ion exchange material of improved stability which comprises calcining a potassium-containing siliceous gel zeolite at a temperature of 800–1400° F., and substituting hydrogen for potassium in the zeolite.

2. The method in accordance with claim 1 wherein the substitution of hydrogen for potassium is effected by acid treatment.

3. The method of preparing a contact mass which comprises calcining a potassium-containing siliceous gel zeolite at a temperature of 800–1400° F., treating the calcined potassium-containing zeolite with an ammonium salt solution to incorporate ammonium in said zeolite by base-exchange, and thereafter heating the resulting product to volatilize ammonia therefrom.

4. The method of preparing a contact mass which comprises the steps of forming a hydrogel comprising silica and alumina and containing sodium as contaminant, removing sodium by treatment with an ammonium salt solution, replacing the ammonium in said gel at least in part by potassium ions, and calcining the potassium-containing product at 800–1400° F.

5. The method in accordance with claim 4 wherein the ammonium in the gel is replaced only in part and in predetermined amount by potassium so that on subsequent calcination ammonium is volatilized to produce a product of desired potassium content, which content is readily replaceable by base-exchange with catalytically active metal ions in substantially stoichiometric amount.

6. The method which comprises reacting sodium silicate and an aluminum compound to form a sodium-containing zeolite, drying the product, removing sodium therefrom by base-exchange with an ammonium salt solution, pelleting the obtained ammonium zeolite, drying the pellets, base-exchanging potassium to replace ammonium in said pellets by treatment of the dried pellets with a potassium salt solution, and calcining the potassium-containing pellets at 800° to 1400° F.

7. The method of claim 6 including the further step of replacing potassium in the calcined pellets by base-exchange with desired cations selected from the group consisting of ammonium, hydronium, and metal cations.

GEORGE R. BOND, JR.

REFERENCES CITED

The following references are of record in the file of this patent:

UNITED STATES PATENTS

| Number | Name | Date |
| --- | --- | --- |
| 1,348,977 | Borrowman | Aug. 10, 1920 |
| 2,143,670 | Young | Jan. 10, 1939 |
| 2,197,862 | Hyman | Apr. 23, 1940 |
| 2,283,172 | Bates | May 19, 1942 |
| 2,283,173 | Bates | May 19, 1942 |
| 2,366,650 | Rawlings | Jan. 2, 1945 |